Feb. 16, 1971   P. O. BRAMANTE   3,562,952
PLANT ANCHOR
Filed July 22, 1968   2 Sheets-Sheet 1
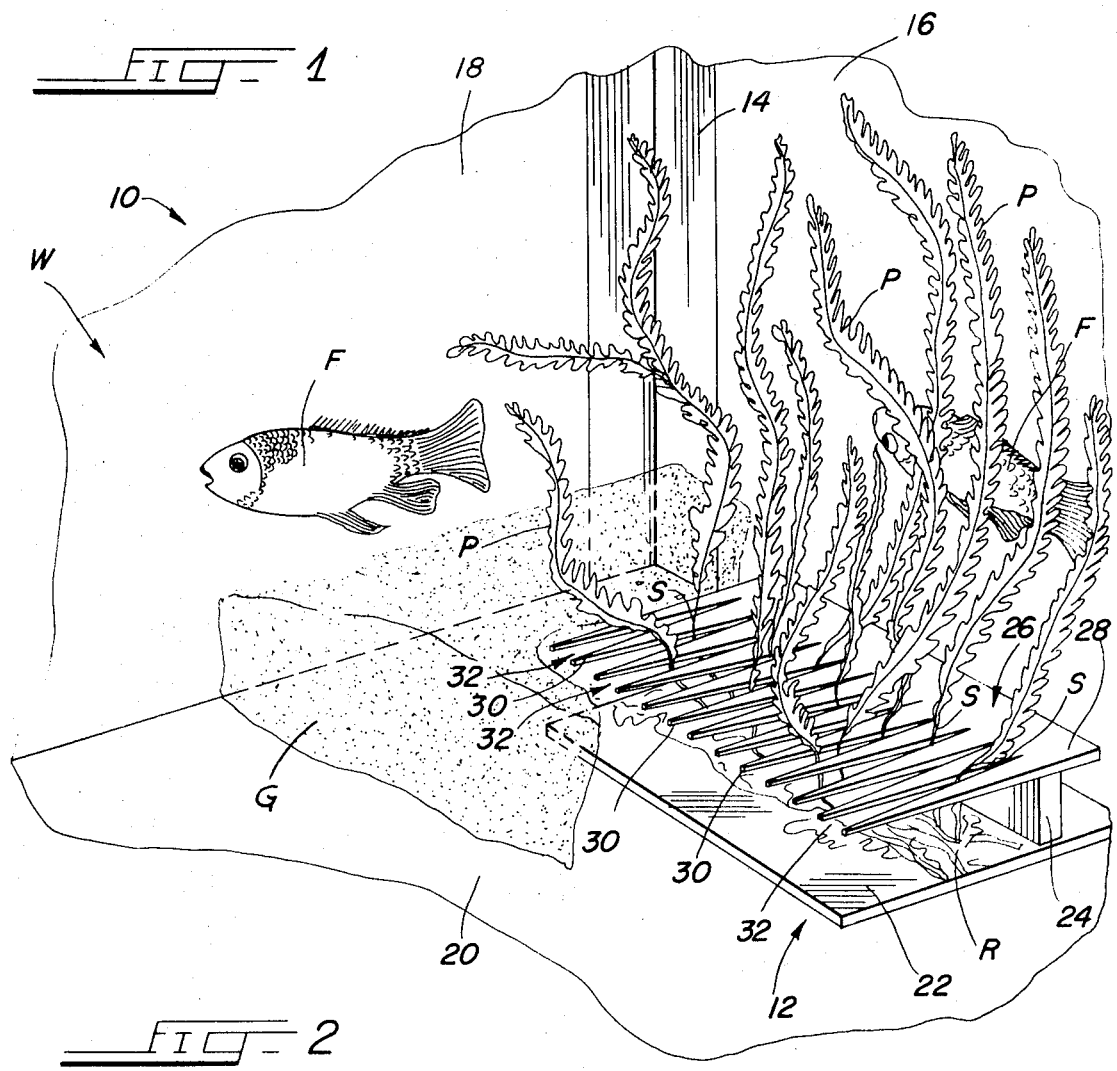
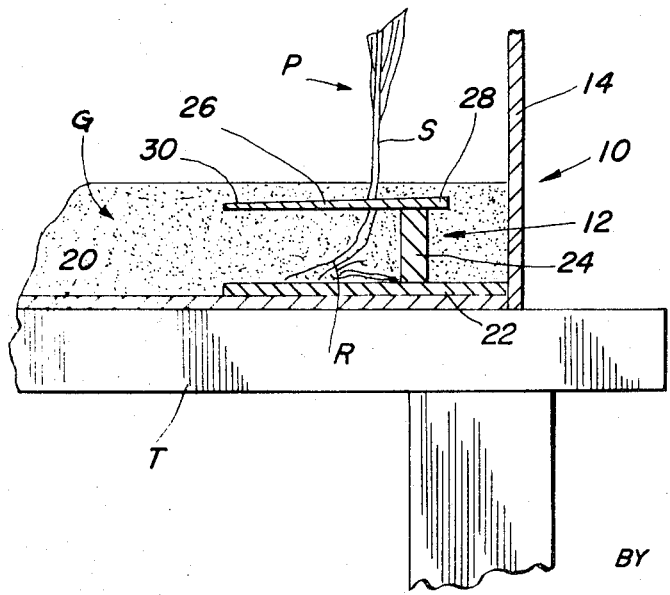
INVENTOR.
PIETRO O. BRAMANTE
BY Feb. 16, 1971   P. O. BRAMANTE   3,562,952
PLANT ANCHOR Filed July 22, 1968   2 Sheets-Sheet 2

INVENTOR.
PIETRO O. BRAMANTE

ATTY.

United States Patent Office

3,562,952
Patented Feb. 16, 1971

3,562,952
PLANT ANCHOR
Pietro O. Bramante, 1112 Wenonah Ave., Oak Park, Ill. 60304
Filed July 22, 1968, Ser. No. 746,377
Int. Cl. A01k *64/00;* A47g *7/07*
U.S. Cl. 47—44                                5 Claims

ABSTRACT OF THE DISCLOSURE

A device which facilitates the planting of plants in aquariums and the like includes a plant holder comprising a plurality of generally horizontal members interconnected at one end, with the other end thereof being open so as to define a plurality of stem retaining slots; and means, such as a relatively wide, generally flat base designed for positioning on the aquarium bottom and an upwardly projecting riser member, for positioning the plant holder in a generally horizontal plane parallel to but spaced apart from the aquarium bottom. Plant stems may be securely placed in the stem retaining slots, and the entire device covered with a layer of gravel so that only the plant stems remain visible.

BACKGROUND OF THE INVENTION

Field of the invention

The subject invention relates to aquarium equipment and more particularly to a device which facilitates the planting and growth of plants in aquariums.

Description of the prior art

One of the most difficult problems encountered in starting an aquarium is the operation of planting the aquarium. Plants are provided in aquariums to accomplish a variety of functions. They provide a natural habitat for the fish, and, in addition, provide a means of protecting smaller fish in the aquarium from the larger ones. Plants utilize waste materials from fish and other animal life in the aquarium, and, likewise, provide oxygen and food for fish and other organisms. Furthermore, plants are useful in that they promote the growth of certain small animals and micro-organisms.

Although it has long been recognized that the presence of plants in aquariums is an absolute necessity, the planting of an aquarium has heretofore been a very cumbersome and difficult task to carry out. Traditionally, aquariums have been planted by carefully covering the individual roots and lower stems of the common rooted plants such as Vallisneria, Sagittaria, and Ludwigia. Satisfactory planting has usually only been obtained by covering the bottoms of the plants by up to about two inches of gravel, which occupies an undue amount of space in the aquarium and which provides a source of contamination as well. With nonrooted plants of the Elodea, Myriophyllum, Cabomba, and Anacharis type, even this approach has been of limited efficiency since, due to the absence of roots, the plants become easily loosened from the gravel and gravel and float to the aquarium surface.

It has been suggested that the best way in which both non-rooted and rooted plants may be securely planted is to weight the lower ends down with small rocks or by wrapping lead strips to their stems. While this obviously is a cumbersome, inconvenient, and unsatisfactory approach, it has heretofore been commonly used due to the absence of satisfactory available alternatives.

A few rather complicated flower-holding devices (see, e.g., Tredup U.S. Pat. No. 2,155,811; Simpson U.S. Pat. No. 2,226,950; Gifford U.S. Pat. No. 2,413,307; Weil U.S. Pat. No. 2,724,213; and Crousore U.S. Pat. No. 3,044,215) do exist, but these devices bear only remote relationship to the present invention and do not fulfill the requirements of a live aquarium.

Accordingly, it is a primary object of the present invention to provide a device which facilitates the planting of aquarium plants of both the rooted and non-rooted class.

A further object is to provide a device of the character described which may easily and simply be employed and yet which is thoroughly reliable.

A further object is to provide a device whereby the operator can prepare in an orderly and leisurely fashion rows of plants in the holder outside the water tank and then can quickly plunge and securely anchor the whole assembly to the bottom of the aquarium with minimal discomfort and by wetting just one arm for a few seconds.

Yet another object is to provide a device of the character described which minimizes the amount of gravel that must be provided in an aquarium thereby to reduce contamination of the aquarium as well as total weight and purchase expenses.

A still further object is to provide a plant supporting device for aquariums and the like which facilitates the healthy growth of plants and which eliminates the necessity for weighting down the plants with foreign objects.

Another object is to provide a device which permits the easy addition, removal, or replacement of plants in an already settled, often crowded and delicately balanced aquarium.

SUMMARY OF THE INVENTION

In accordance with the present invention, it has been found that a plant supporting device for aquariums and the like comprises plant holder means, including a plurality of generally horizontal members interconnected adjacent one end thereof, with the other ends thereof being free so as to define therebetween a plurality of stem retaining slots; and support means for the plant holder means for positioning the plant holder means in a plane generally parallel to but spaced apart from the bottom of the aquarium in which the device is positioned. Preferably, the support means comprises a generally thin and flat base member positionable on the aquarium bottom and a riser member projecting upwardly generally perpendicularly therefrom and on which the plant holder means is attached adjacent the interconnected ends of the horizontal members. It is especially preferred that the entire device be integrally molded of a synthetic molded plastic resin material, although any other material, including metal, rubber, or wood, could equally well be employed.

DESCRIPTION OF THE DRAWINGS

The foregoing and other objects, advantages, and features of the subject invention will hereinafter appear, but, for purposes of illustration, but not of limitation, exemplary embodiments of the present invention are shown in the accompanying drawings, in which:

FIG. 1 is a fragmentary, partially cut away view of an aquarium containing plants supported by a device in accordance with the present invention;

FIG. 2 is a side elevational view thereof, partially in section;

DETAILED DESCRIPTION OF THE PREFERRED EMBODIMENTS

Figure 3:
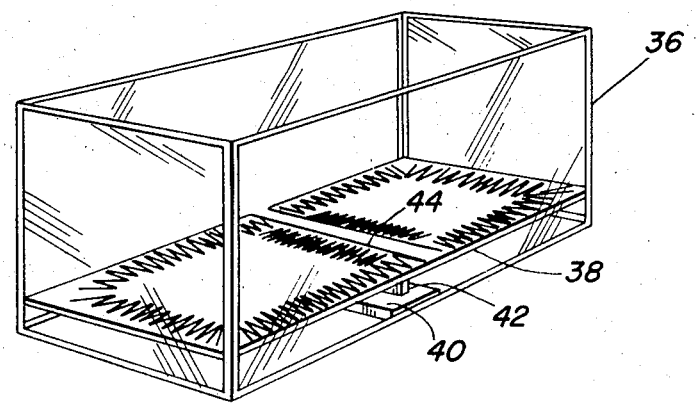
FIG. 3 is a perspective view of an aquarium containing a modified plant supporting device in accordance with the present invention.

FIGS. 1 and 2 show an aquarium 10 in which is provided a plant supporting device 12 in accordance with the teachings of the present invention. Aquarium 10, which is conventional and does not form a part of the present invention, comprises a series of corner angles 14 (only one of which is shown in FIGS. 1 and 2), side walls 16, 18 of plate glass or the like, and a bottom 20, which may also be of plate glass, slate, or other material. Aquarium 10 is usually placed on a table T as shown in FIG. 2.

A quantity of water W is provided within the aquarium 10, and fish F of any suitable variety are provided in the aquarium as well along with a plurality of plants P having stems S. Certain of the plants P have root structures R, whereas other plants may be of the non-rooted class. Suitable rooted plants include Vallisneria, Sagittaria, and Ludwigia, while exemplary non-rooted plants include Elodea, Myriophyllum, Cabomba, and Anacharis. Of course, the precise type of variety of plants employed in an aquarium is not critical, and the device of the present invention may function as a supporting aid for substantially any plant suitable for use in an aquarium. Indeed, the device of the present invention is highly satisfactory as a supporting structure for artificial plants fabricated from plastic or the like.

As shown in FIGS. 1 and 2, plant supporting device 12 comprises a generally flat base 22 designed to be placed on the aquarium bottom 20 and, if desired, flush against aquarium side wall 14. Device 12 further comprises a riser member 24 projecting substantially perpendicularly upward from the base member 22, and a plant holder 26 fixed to the riser member for a purpose that will hereinafter appear.

Plant holder 26 comprises a unitary rear section 28 fixed by suitable means to the riser 24, and a plurality of outwardly projecting fingers 30. Fingers 30 are preferably resilient and, because of their position in a plane parallel to and spaced away from the aquarium bottom 20, they serve to define a plurality of stem retaining slots 32.

As best shown in FIG. 1, fingers 30 are tapered from relatively wide bases adjacent the rear section 28 substantially to relatively thin points at their free ends. As a result, stem retaining slots 32 are likewise tapered from their relatively wide open ends to points adjacent rear section 28.

In operation, plants P are quickly and conveniently positioned within the aquarium merely by sliding the stem S of a plant into one of the slots 32 until it is gently but securely held. Retention of the plant stems therein may be achieved by employing the tapered slots 32 shown in FIG. 1, or, alternatively, non-tapered slots may be employed of a dimension slightly smaller than a typical plant stem, with the resiliency of the fingers 30 providing sufficient pressure to retain the plants in position.

The roots R of rooted plants are free to spread beneath the plant holder 26 and assume healthy growth positions in a layer of gravel G (see FIG. 2) which is spread on the bottom of the aquarium 20 so as just to cover all of the device 12. Where non-rooted plants or artificial plants are employed, planting is accomplished in the same manner with the stems being wedged into position in the slots in the holder 26.

However, unlike arrangements heretofore utilized, the amount of gravel that must be provided in the bottom of the aquarium is substantially diminished (i.e., of the order of magnitude of less than one inch as opposed to two inches or more that must be provided in the absence of the plant holding device 12). Since gravel is a source of dirt and contamination in the aquarium, the "water pollution" problems encountered are substantially diminished through the use of the device of the present invention. Additionally, a substantial reduction in the amount of gravel present in the bottom of the aquarium is both economically and aesthetically highly desirable. Moreover, the increased safety of a lighter aquarium is self-evident.

The relatively wide base 22 provided in the device lends stability and prevents it from being misplaced once the thin layer of gravel is positioned within the aquarium. By dimensioning the base as shown in FIG. 2, the base may be butted against the side wall 14 of the aquarium, and yet the row of plants P is neatly spaced away from the aquarium wall thereby providing space for smaller fish to circulate and play between the plants and the wall, thereby giving a superior visual arrangement and providing greater protection for the smaller fish. A base having a width of the order of magnitude of about two inches is sufficient for this purpose.

By using a device 12 such as that described, the lead weights or rocks heretofore used to "anchor" plants in the aquarium and to prevent them from floating to the surface are no longer required. In addition, since the roots of rooted plants are no longer used to retain the plants in a planted position, the plants grow in a healthier fashion. Thus, use of the device of the present invention quite favorably compares with previous methods requiring strenuous sessions with both arms underwater for long periods of time and uncertain results of placement of the flora.

Figure 4:
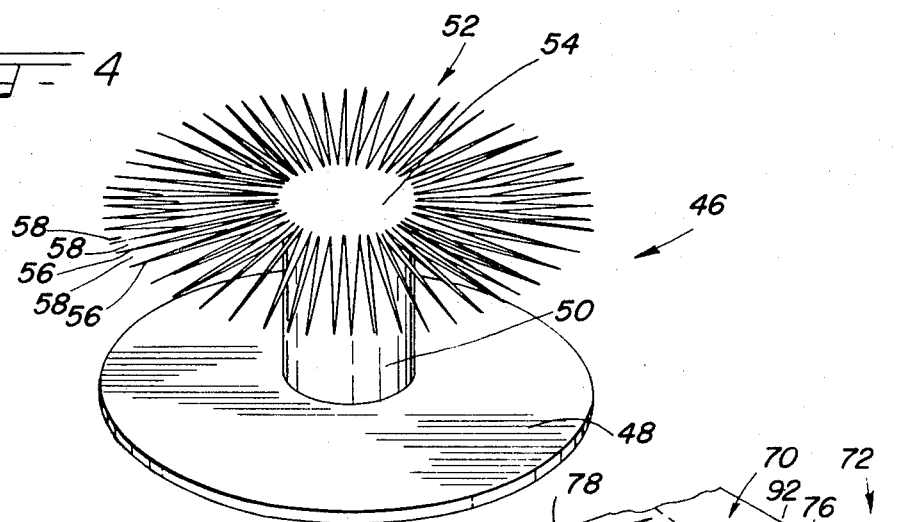
FIG. 4 is a perspective view of yet another embodiment of the present invention.
Figure 5:
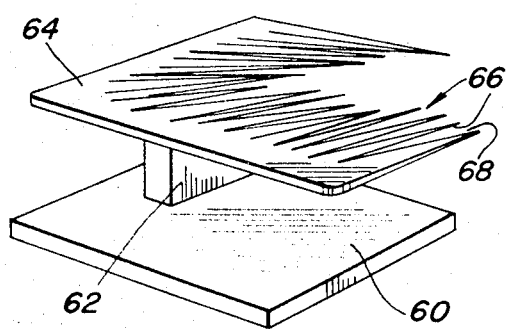
FIG. 5 is a perspective view of yet another modification of the present invention.

FIGS. 3–5 show several of the variety of configurations for the plant anchor development of the present invention. FIG. 3 shows an aquarium 36 in which a plant supporting device 38 is disposed. A single base 40 is centrally provided in the container and a single riser 42 projects upwardly therefrom and contacts the center section of a twin plant support arrangement 44 having opposed sets of projecting fingers provided thereon. In addition, plant holders, similar to plant holder 26 shown in FIGS. 1 and 2, extend peripherally around the interior of the aquarium 36, and all rely for their support on base 40 and riser 42. However, in the case of an extra large device 38 as depicted in FIG. 3, more supporting bases of similar configuration may become necessary.

FIG. 4 illustrates a plant supporting device 46 comprising a circular base 48, a cylindrical riser 50, and a plant holder 52 having a solid central section 54 and a plurality of radially extending fingers 56 defining therebetween stem retaining slots 58. The natural taper of the fingers 56 is augmented by their radial disposition.

FIG. 5 shows a "corner anchor," comprising a base 60, a riser 62, and a plant holder 64 designed to be positioned in an aquarium corner and containing a plurality of fingers 66 defining stem retaining slots 68.

Figure 6:
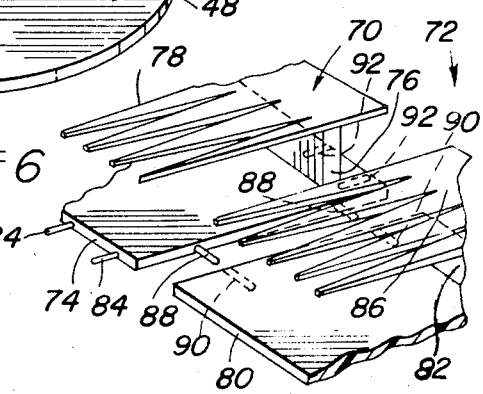
FIG. 6 is a perspective view of yet another modification of the present invention.

FIG. 6 illustrates yet another modification of the present invention in accordance with which a series of small modular units of fixed size and shape are provided with interlocking means for interconnecting adjacent units. Such units can be fastened together in rows of elements of unlimited length and configuration in order to suit the dimensions of the aquarium and the imagination of the aquarist.

More particularly, in FIG. 6 two such modular units 70, 72 of a series are shown. Modular unit 70 comprises a base 74, a riser 76, and a plant holder 78 in accordance with the teachings of the present invention. Unit 72 likewise comprises a base 80, a riser 82, and a plant holder 86. Suitable interlocking means, such as prongs 88 and corresponding sockets 90, are provided on each unit (although, of course, any other suitable interlocking means could be employed) in order to permit the removable attachment of adjacent units. In addition, prongs 84 and sockets 92 may be provided on different sides of the units in order to facilitate arrangement of the units in differing geometrical configurations.

As previously noted, it is preferred that the various elements of the supporting device of the present invention be fabricated from synthetic plastic resin material.

Suitable plastics include polyethylene, polypropylene, resins of the ABS category (i.e., acrylonitrile, butadiene, styrene resins), Delrin, Teflon, and any of the other varieties of synthetic plastic resin materials compatible with animal and plant life, which may be molded in the geometric configurations required by the device of the present invention. It is especially preferred that the plant supporting device (i.e., base, riser, and plant holder) be integrally molded in one piece as a single unit, although the various elements may be separately molded and affixed together. Synthetic plastic resin materials are preferred over metallic parts by reason of their long life, their resistance to corrosion and contamination, and their neutrality to the aqueous environment provided in aquariums.

As will be obvious to those skilled in the art, substantially any arrangement of supporting means and substantially any configuration of plant holder may be employed to yield any desired geometrical arrangement for plant supports so long as the plant holder serves to define a plurality of generally horizontally disposed stem-retaining slots in a plane substantially parallel to but spaced apart from the aquarium bottom. Also, "midget" plant anchors of identical characteristics as the others but of substantially smaller size, are quite satisfactory for holding plants at the bottom of common fish bowls, which are so popular among children and beginners.

I claim:
1. A device for supporting plants in aquariums and the like comprising:
  a plurality of modular plant supporting units, each such modular unit comprising:
    plant holder means including a plurality of narrow elongated generally horizontal members interconnected adjacent one end in a spaced relationship, with the other end of each such unit being free, so as to define therebetween a plurality of stem retaining slots having an entrance dimension thereof substantially less than the dimension of the depth of said slot; and
    a plural sided support means attached to the plant holder means positioning the plant holder means in a plane generally parallel to, but spaced apart from, the bottom of an aquarium in which the plant supporting device is positioned; and
    interlocking means integral with said support means and on at least two sides thereof removably interconnecting adjacent modular units.

2. A device, as claimed in claim 1, wherein the support means of each modular unit comprises:
  a base member adapted for placement on the aquarium bottom; and
  a riser member fixedly positioned between the base member and the plant holder means of the modular unit with the plant holder means being fixed thereto adjacent the interconnected ends of the horizontal members.

3. A device, as claimed in claim 2, wherein the plant holder means, base member, and riser of each modular unit are fabricated from synthetic molded plastic resin material.

4. A device, as claimed in claim 2, wherein the plant holder means, base member, and riser of each modular unit are integrally molded from synthetic plastic resin material.

5. A device as claimed in claim 1, wherein said plant holder means is fabricated from a resilient material.

References Cited

UNITED STATES PATENTS

| | | | |
|---|---|---|---|
| 69,026 | 9/1867 | Richmond | 211—65X |
| 980,565 | 1/1911 | Sanborn | 47—41.11 |
| 1,310,814 | 7/1919 | Ward | 312—10 |
| 2,155,811 | 4/1939 | Tredup | 119—5 |
| 2,357,646 | 9/1944 | Gilbert | 211—60 |
| 3,303,610 | 2/1967 | Erbguth | 47—41.11 |

FOREIGN PATENTS

| | | | |
|---|---|---|---|
| 1,390,943 | 1/1965 | France | 47—1.2 |

ROBERT E. BAGWILL, Primary Examiner

U.C. Cl. X.R.

47—41.11; 119—5; 211—40